United States Patent
Moore

[11] 3,762,433
[45] Oct. 2, 1973

[54] AUTOMATIC FLUID FLOW CONTROL FOR PRESSURE ACTUATED DEVICES

[76] Inventor: Robert M. Moore, 4695 S. Jason St., Englewood, Colo. 80110

[22] Filed: July 26, 1972

[21] Appl. No.: 275,226

[52] U.S. Cl.................. 137/469, 137/494, 137/504
[51] Int. Cl. ........................................... G05d 7/01
[58] Field of Search................ 137/494, 504, 484.2, 137/455, 469, 472, 470, 473, 471

[56] References Cited
UNITED STATES PATENTS

| | | | |
|---|---|---|---|
| 2,488,949 | 11/1949 | Walsh ............................ | 137/494 X |
| 2,596,368 | 5/1952 | Brunton ........................ | 137/470 |
| 3,344,806 | 10/1967 | Schultz ......................... | 137/494 |

Primary Examiner—Henry T. Klinksiek
Assistant Examiner—Robert J. Miller
Attorney—Bertha L. MacGregor

[57] ABSTRACT

An automatic fluid flow control for pressure actuated devices comprising means for automatically maintaining selected predetermined speeds of operation in response to variations in back pressure produced in the control by varying loads imposed on the work to which the control is operatively connected. The control is installed in a pressure fluid conduit between a fluid source and the work to be actuated thereby. It comprises a housing having a back pressure chamber communicating with the pressure actuated work, a tubular fluid intake member movable in axial directions provided with an opening communicating with the back pressure chamber, a piston and sleeve slidably mounted on the intake member covering the opening to varying degrees, an adjustment member for adjusting the position of the intake member in the housing, and a spring bearing on the adjustment member and the piston, whereby variations in load imposed on the work produce back pressure in the chamber and automatic movement of the piston and sleeve to vary the size of the opening and passage of pressure fluid therethrough to the work to maintain uniform selected predetermined speed of operation of the work.

7 Claims, 2 Drawing Figures

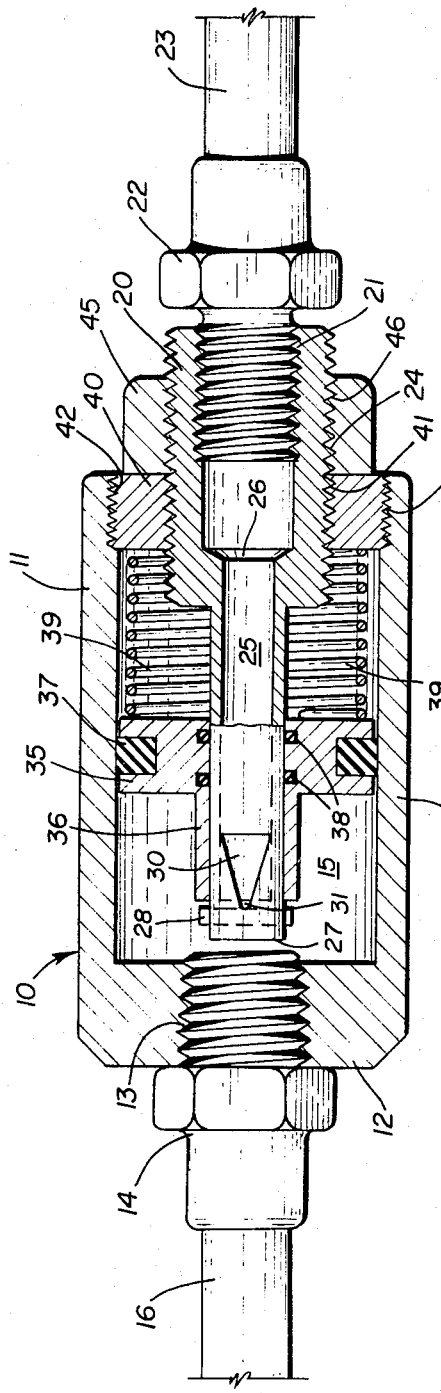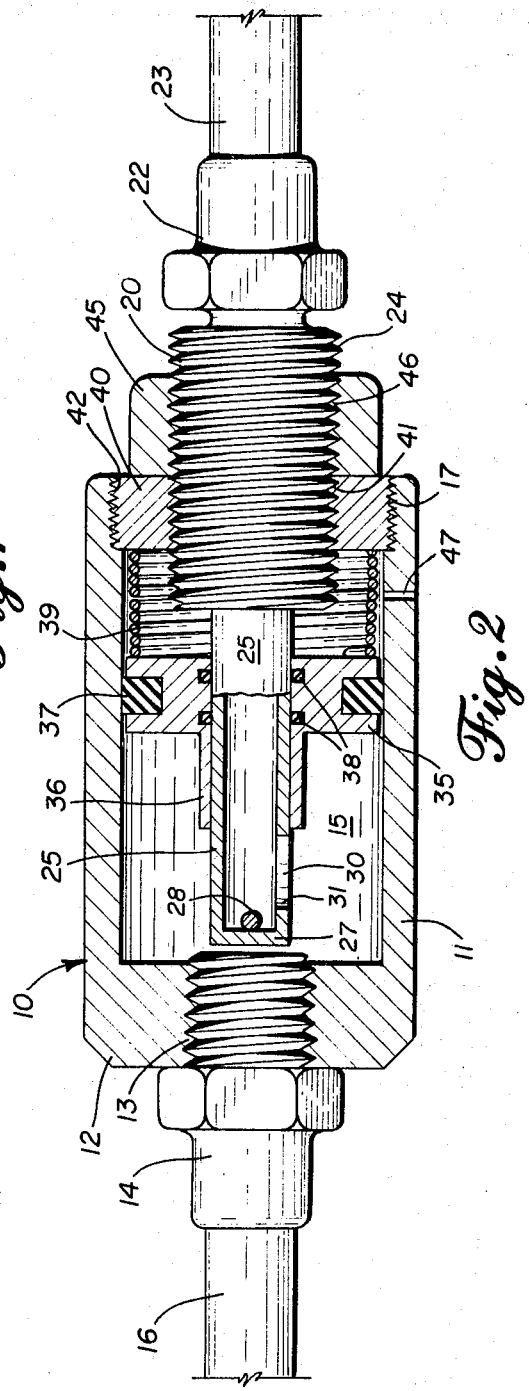

AUTOMATIC FLUID FLOW CONTROL FOR PRESSURE ACTUATED DEVICES

This invention relates to an automatic flow control device which is self contained and designed to be installed in a fluid conduit which conducts pressurized fluid from a source to a tool to be operated thereby. The fluid control device functions automatically to maintain selected predetermined speeds of operation in response to variations in back pressure caused by varying loads imposed on the tool or other fluid operated mechanism, to which the control device is operatively connected.

The main object of the invention is to control fluid pressure and volume input to a tool head or mechanism to maintain predetermined substantially uniform pressure on the tool or mechanism. Heretofore compressed air or other fluid has been fed from a source into a conduit and conveyed directly to a tool or mechanism for rotating the tool head at a selected speed, but if the load on the tool or mechanism varies, the rotary speed of the tool also varies. By the use of the automatic flow control device of this invention, back pressure in the device resulting from increased load on the tool functions automatically to increase the fluid flow input to the tool to the degree required for maintaining the selected predetermined speed of operation. The absence of back pressure in the device during periods of normal predetermined speed of operation functions automatically to maintain the initially selected speed. For example, a fluid cylinder actuated ram, encountering increased weights in the course of its travel, causes increased back pressure in the device of this invention and thereby causes increased energy input to the ram as required by the increased load thereon.

When embodied in a fluid powered grinder, rated to run at 20,000 RPM, a high speed which would burn the material being ground, the automatic fluid control device functions to maintain a slower speed with sufficient power to perform the grinding operation.

For the purpose of driving fasteners such as screws and nuts, an automatic start fluid powered driver is desirable. The automatic control device of my invention, used in conjunction with a positive drive screw driver, will make such a screw dirver an automatic start driver. The screw driver tool will run at idle until power is required, at which time it will automatically develop predetermined power and set the fastener such as a screw or nut, and when removed from the fastener the tool will assume idle speed.

The automatic fluid control device may be used to maintain uniform pressures on separate means such as air pads used to support test vehicles where different weights may be imposed on the separate pads.

The device has many applications in the fluid power industry which make present equipment more versatile, and new equipment less expense to produce as well as more versatile. In order to obtain the automatic flow control most suitable for any given situation, several variables may be adopted, such as piston diameters, spring tension, orifice or orifices configurations, in-line pressure and input line CFM or flow.

In the drawing:

FIG. 1 is a horizontal sectional view, partly in elevation, of an automatic fluid control device embodying my invention, showing the parts in the positons they assume when no back pressure exists in the device.

FIG. 2 is a horizontal sectional view, partly in elevation, showing the device turned 90° from the FIG. 1 position, and showing the parts in the positions they assume when back pressure exists in the device.

In the embodiment of the invention shown in the drawings, a housing 10 comprises a hollow cylindrical body 11 with integral end 12 provided with a central threaded opening 13 for reception of a threaded coupling 14 communicating with a chamber 15 in the housing 10 and a conduit 16 leading to a fluid actuated tool or other mechanism (not shown) to be controlled by the device of this invention. The opposite end of the housing body 11 is open and internally threaded at 17 adjacent the edge of the open end.

The automatic control parts mounted in the housing 10 comprise a fluid intake member 20, tubular in form and internally threaded at 21 for reception of a threaded coupling 22 connected to an air or other fluid conduit 23 which conveys pressurized fluid to the intake member 20. The member 20 is externally threaded as indicated at 24 throughout its larger diameter portion, and is integral with a smaller diameter tubular portion 25. The inner diameter of the fluid intake member 20 is larger than the inner diameter of the portion 25 as shown in FIG. 1 at the junction 26 of the two bores. The end 27 of the fluid intake member portion 25 is closed. A dowel pin 28 extends through the member 25 adjacent the closed end 27 and projects slightly outwardly at opposite ends beyond the said portion 25.

A triangularly shaped opening 30 is provided in the fluid intake member portion 25 located so that its apex 31 is in a plane adjacent the pin 28, and is always exposed to allow passage of fluid regardless of the positon of a piston about to be described. The shape of the opening 30 may be varied as hereinafter explained.

A piston 35 and an integral sleeve 36 are slidably mounted on the fluid intake member 25. Piston rings 37 of any suitable material provide sealing contact with the inner surface of the housing body 11. O-rings 38 are located between the piston 35 and air intake 25. Movement of the piston and sleeve in one direction is limited by the pin 28 and in the other direction by a spring 39 that surrounds portions of the intake members 25 and 20 and bears at one end on the piston 35 and at the other end on a threaded adjustment member or washer 40.

The washer 40 is threaded on its inner surface 41 to engage the threaded surface of the intake member 20, and is threaded on its outer surface 42 to engage the internally threaded portion of the housing body 11. Thus the washer 40 serves as means for adjusting the position of the intake member 20-25 relatively to the washer and housing. This adjustment of the intake member is made to vary the spring pressure in accordance with the reqirements of the work to be performed. A lock nut 45 threadedly engages the member 20 as indicated at 46, and bears against the washer 40 to lock the intake member in adjusted position for the particular work to be performed.

A vent 47 in the housing body 11 provides communication with the atmosphere.

The operaton of the device is as follows:

The fluid intake member 20-25 is mounted in the housing 10 in selected position by adjustment of the intake member relatively to the washer 40 threadingly engaging the member 20 and the threaded end of the housing body 11, and locked by the nut 45, according to the speed requirement of the particular work to be performed. This adjustment alters the compression-expansion characteristic of the spring 39 bearing on the piston 35 in the FIG. 1 position of the parts. If the load on the work remains constant, the fluid passage through the input member 20–25, opening 30, chamber 15, coupling 14 and conduit 16 also remains constant. If the load increases, back pressure develops in the chamber 15 and causes the piston to move to the right of its FIG. 1 position, thereby exposing increasing areas of the opening 30, to quickly automatically increase the input of pressurized fluid into the chamber 15 for passage to the work and thus to maintain uniform energy output to the work, and automatic return to the predetermined selected speed when the load is again lessened.

The triangular shape of the opening 30 is well suited to the carrying out of the intended functions of this device, but obviously the form of the opening may be modified to provide varying degrees of fluid input to the chamber depending on the work loads imposed on the tool or mechanism performing the work. When the triangular form of opening 30 is used, the apex 31 provides a small bleeder opening for the limited fluid intake required to maintain relative pressures, and the larger opening 30 quickly produced by small movement of the piston and its sleeve under influence of back pressure, automatically and instantaneously provides the increased fluid intake needed to maintain uniform speed of operation of the tool or mechanism controlled by the device.

The small bleeder opening 31 may be separate from the opening 30; for example, it may be a small vent in the closed top 27 of the intake portion 25 or in the tubular wall of the portion 25 near its top 27. The opening 30 may be rectangular or other shape to permit quick passage of pressure fluid through the back pressure chamber to the work when increased back pressure (caused by increased load on the work) forces the piston and sleeve to the right of FIG. 1 against the spring 39, and exposes varying areas of the opening 30.

I claim:

1. An automatic fluid flow control for pressure actuated work for maintaining uniform selected predetermined speed of operation of the work under varying load conditions comprising
   a. a housing having a back pressure chamber therein communicating with the work to be actuated by the controlled fluid flow,
   b. a tubular fluid intake member movable in axial directions relatively to the housing mounted in the housing in communication with a pressure fluid source,
   c. an opening in the intake member permitting passage of fluid from the intake member to the back pressure chamber,
   d. a piston and sleeve slidably mounted on the intake member and movable to positions wherein the sleeve covers variable areas of the opening,
   e. an adjustment member mounted in the housing and engaging the intake member for initial adjustment of the position of the intake member, and
   f. a coiled spring surrounding the intake member and bearing at one end on the piston and at the other end on the adjustment member,
   whereby variations in the predetermined work load produce variations in back pressure in the back pressure chamber and cause movement of the piston and sleeve to vary the size of the opening in the intake member and consequent passage of pressure fluid therethrough to maintain the selected predetermined speed of operation of the work.

2. The control defined by claim 1, in which the opening in the fluid intake member is triangular in shape, with its apex removed from the piston and sleeve.

3. The control defined by claim 1, in which the fluid intake member is provided with a bleeder opening which permits restricted passage of fluid from the intake member to the back pressure chamber when there is no back pressure in the chamber, and with a larger opening which permits quickly increased passage of fluid from the intake member to the back pressure chamber when the piston and sleeve are moved by increased back pressure.

4. The control defined by claim 1, in which the housing is provided with an open end and threads on its inner surface adjacent said end, and in which the adjustment member is a washer having a central threaded opening engaging the intake member and having threads on its periphery which engage the threads on the housing.

5. The control defined by claim 1, in which the fluid intake member is threaded on its outer surface for reception of a coupling to a pressure fluid source, and for engaging the threaded washer.

6. The control defined by claim 1, in which the fluid intake member has a central bore larger at the portion connected to the pressure fluid source.

7. The control defined by claim 1, which includes a lock nut threaded on the intake member and bearing against the adjustment member to retain the intake member in its initially adjusted position.

* * * * *